United States Patent [19]

Stahl et al.

[11] Patent Number: 4,548,755
[45] Date of Patent: Oct. 22, 1985

[54] PROCESS FOR THE EXTRACTIVE PRODUCTION OF VALUABLE NATURAL WAXES

[75] Inventors: Egon Stahl, Saarbrücken-Scheidt; Karl-Werner Quirin, Dillingen, both of Fed. Rep. of Germany

[73] Assignee: SKW Trostberg Aktiengesellschaft, Trostberg, Fed. Rep. of Germany

[21] Appl. No.: 469,490

[22] Filed: Feb. 24, 1983

[30] Foreign Application Priority Data

Mar. 4, 1982 [DE] Fed. Rep. of Germany ....... 3207914

[51] Int. Cl.$^4$ .............................................. C11B 1/10
[52] U.S. Cl. .................................... 260/412.8; 208/24; 208/28; 208/30; 208/33; 260/412; 260/412.4; 260/412.6; 260/428; 260/428.5
[58] Field of Search .................. 260/412, 412.4, 412.8, 260/428, 428.5, 412.6; 208/20, 24, 28, 31, 33, 30

[56] References Cited

U.S. PATENT DOCUMENTS

| | | | |
|---|---|---|---|
| 2,847,356 | 8/1958 | Pieters et al. | 208/30 |
| 3,064,018 | 11/1962 | Bruera | 260/412.8 X |
| 3,684,685 | 8/1972 | Herbstman et al. | 208/28 X |
| 3,684,686 | 8/1972 | Herbstman et al. | 208/28 X |
| 3,796,651 | 3/1974 | Rojey | 208/24 |
| 3,923,847 | 12/1975 | Roselius et al. | 260/412.8 |
| 3,969,196 | 7/1976 | Zosel | 203/49 |
| 4,280,961 | 7/1981 | Schneider et al. | 260/412.8 |
| 4,367,178 | 1/1983 | Heigel et al. | 260/412.8 X |

FOREIGN PATENT DOCUMENTS

| | | |
|---|---|---|
| 2843920 | 4/1980 | Fed. Rep. of Germany . |
| 1390751 | 1/1965 | France . |
| 2032789 | 5/1980 | United Kingdom . |

OTHER PUBLICATIONS

Recent Developments Separation Science, Nr. 3, Teil A, 1977, Seiten 171-193 C. A. Irani et al.: "Separations Using Supercritical Gases" *Seite 187; Seite 198, Spalte 2; Seite 189, Spalte 1*.

Primary Examiner—Helen M. S. Sneed
Attorney, Agent, or Firm—Felfe & Lynch

[57] ABSTRACT

Process for the extractive production of valuable, natural waxes from fossil and/or freshly grown vegetable and/or animal starting material by extraction of the starting material in an extraction stage with a physiologically unobjectionable gas at supercritical pressure and temperature conditions, separation of the extract-containing gas in a separator part by pressure reduction and/or temperature change, periodical or continuous withdrawal of the extract and return of the separated gas to the extraction stage.

16 Claims, 1 Drawing Figure

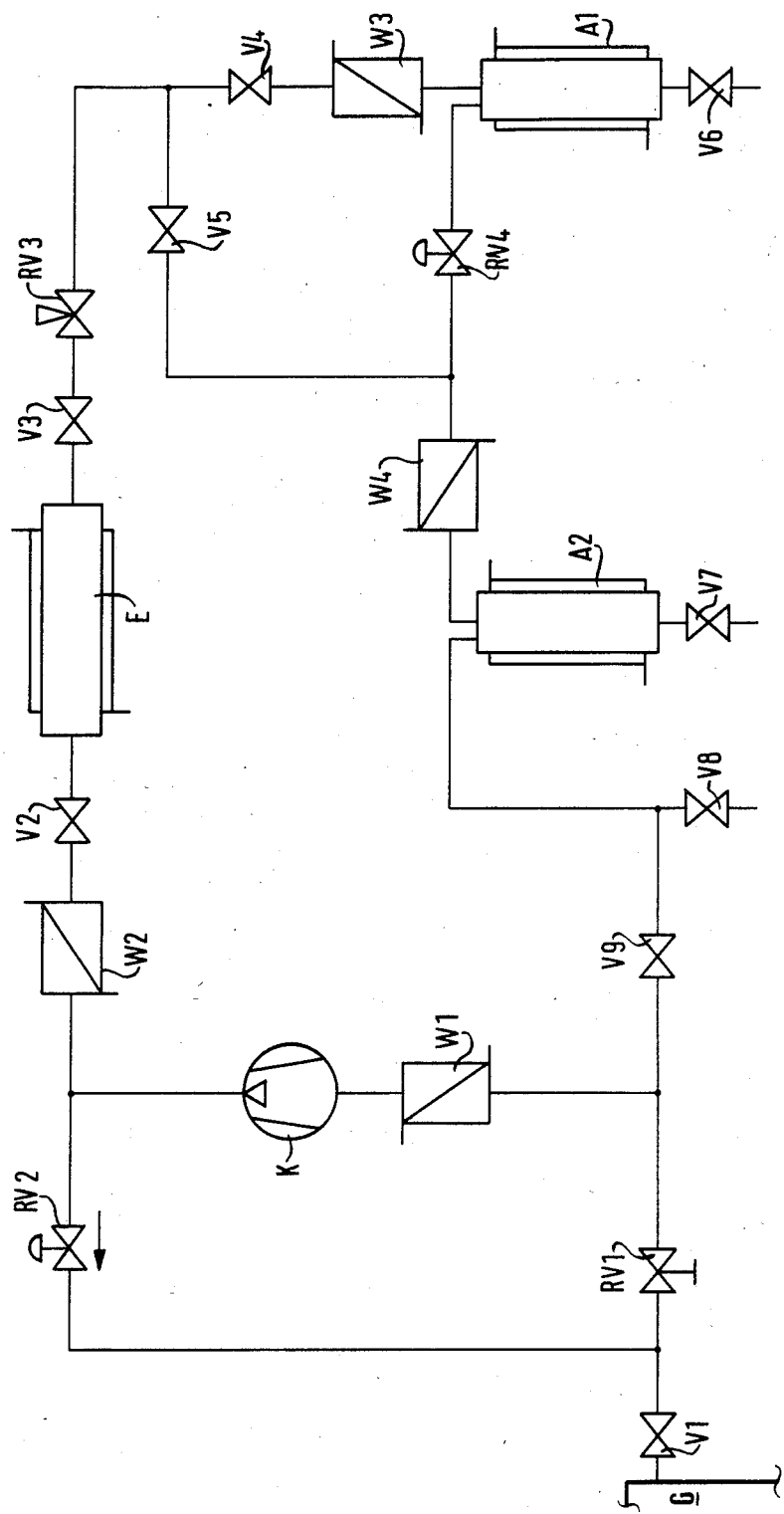

PROCESS FOR THE EXTRACTIVE PRODUCTION OF VALUABLE NATURAL WAXES

DESCRIPTION

The subject matter of the invention is a process for extractively obtaining valuable natural waxes from fossil and/or subsequent vegetable and/or animal starting material.

Waxes are complexly built mixtures of many compounds, which only in rare cases have been completely analyzed. In the scope of the present invention, the term "wax" includes mixtures which consist preferably of the derivatives of long-chain hydrocarbons containing a variety of functional groups, and especially of the esters of mostly linear carboxylic acids or hydroxycarboxylic acids of high molecular weight with mostly linear aliphatic alcohols, but also sterols, of high molecular weight. The starting materials for obtaining these waxes are fossil raw materials as well as, and especially, subsequent natural products, which contain the waxes formed by vegetable or animal metabolism.

In the case of conventional methods of production, which usually include extraction with an organic solvent, such as chlorinated hydrocarbons, benzine fractions and the like, most of the raw products that result often contain undesirable admixtures, have a brown to fatty gray colored appearance, and have disadvantageous sensory properties.

However, since wax products are widely used in the pharmaceutical chemical and cosmetic industry as ointment bases, suppository compositions, as glazes in the production of dragees etc., in the cosmetic chemical industry as bases for the preparation of brilliantines, skin creams, lipsticks, bath oils etc., and in the food industry as cheese wax, for wax coatings on fruits etc., waxes for these applications must neet stringent requirements, especially as regards their tolerability, their physiological acceptability and their smell and taste qualities.

Up until now, attempts have been made, by laborious, energy-consuming and environmentally polluting purification processes, such as boiling with active carbon and bleaching earth followed by filtration, by reaction with peroxides, by washing with acids and lyes, by extraction with certain mixtures of solvents, etc., to convert the raw waxes obtained by conventional methods to a more valuable, ready-to-use form. These conventional methods not only necessitate an additional energy-intensive drying process, but they also suffer the disadvantage that solvent residues or chemically aggressive substances always remain in the wax residue, and they be completely removed only at great expense or not at all.

Processes are already known in which an extraction of components of natural raw products is performed by the use of gases under supercritical conditions. In accordance with DE-PS No. 2,127,611, spice extracts of natural composition are obtained by extraction with gases under supercritical conditions. DE-PS No. 2,709,033 describes a process for the extraction of camomile with supercritical gases. These and other methods are especially intended for the purpose of obtaining lipophilic components, preferably ethereal oils, having a high vapor pressure and good solubility. DE-OS furthermore describes a process for obtaining oils from vegetable fats, in which the fat is extracted with supercritical gases, preferably from seeds as raw material. DE-OS No. 2,843,920 represents the fatty oils obtained in this manner as raw oils and proposes a further treatment of same with supercritical gases for purposes of their refinement and fractionation. DE-PS No. 2,332,038 discloses a method of deodorizing fats and oils with supercritical gases.

The relevant literature, however, gives no examples or indications that waxes are also obtainable by methods of extraction or refinement by means of gases under supercritical conditions. This is not surprising, since the often poor solubility of this class of substances in classical lipophilic solvents is sufficiently known from the literature.

It has now surprisingly been found that it is possible by means of an extraction with gases under supercritical conditions to extract waxes from raw products, and, in a simple process step, to obtain valuable refined products of surprisingly great purity.

The present invention is therefore a process for the extractive production of natural waxes from starting materials obtained from fossil, vegetable or animal sources, by extracting the starting material with a physiological unobjectionable gas under supercritical pressure and temperature conditions and, thereafter, separating the extract containing gas from the extract by changing the pressure and/or temperature conditions.

The most preferred gases are alkanes or alkenes of up to 3 carbon atoms which may be partially or fully fluorinated, $N_2O$, $CO_2$, $SF_6$, Ar, $N_2$, or a mixture thereof.

The invention thus concerns a process for extractively producing valuable natural waxes from fossil and/or subsequent vegetable and/or animal starting material, which is characterized in that, in an extraction step, the starting material is extracted with a physiologically unobjectionable gas at supercritical pressure and temperature conditions, the extract-containing gas is separated in a separation step by pressure reduction and/or temperature change, the extract is withdrawn periodically or continuously, and the separated gas is returned to the extraction step.

In the process of the invention, the fossil, vegetable or animal raw products containing the desired wax are used as the starting material. Instead of putting the starting material in directly, it is also possible in a preferred embodiment of the invention to subject it first to a preliminary mechanical treatment for the purpose of a very rapid and exhaustive wax recovery, for example comminution, grinding and the like. It is, of course, also possible to increase the percentage of wax substances contained in the material by a simple preliminary treatment of the starting material in a manner known in itself, and then to subject the product concentrated in this manner to the claimed extraction treatment. At the same time it is also possible to use as starting material wax-enriched residues and parts which occur as by-products in the course of a process for the production of other raw materials, such as cane sugar, sheep's wool etc. Furthermore, press residues, filter residues and the like, which are produced in conventional wax recovery and refinement, and which can no longer be further processed economically and/or yield products of lesser value, can be subjected with advantage to the extraction process of the invention.

In the process of the invention, any physiologically unobjectionable gases can be used as extractant, preferably alkanes and alkenes containing up to three carbon atoms, as well as their partially or completely fluorinated derivatives, and $N_2O$, $CO_2$, $SF_6$, Ar and $N_2$, it being possible to use these extractants singly or in the form of mixtures. However, the use of carbon dioxide as the extractant, which is safe to handle, nonpolluting and inexpensive, is preferred.

According to another preferred embodiment of the invention, it is possible by performing the extraction and/or the separation in stages to achieve a fractionation of the extracted wax. For example, in extraction by a change in pressure and/or temperature, a step-wise increase of the density of the extractant and hence of its solvent power can be brought about, and/or in the case of separation by a change in pressure and/or temperature a step-wise lowering of the density of the extractant and hence of its dissolving power for the extracted components can be achieved. By these measures a fractional extraction or fractional separation of the wax can be achieved. In the discontinuous method of procedure, this fractionation can be further increased in accordance with the invention by withdrawing the extract from the separation stage in portions at different intervals of time, thus separating a kind of "first runnings."

The "fractionation" achieved in this manner does not necessarily mean striving for an extensive breakdown of the extracted mixture into its individual components, since the properties which a wax might have are the result precisely of its component mix, and the individual components do not have these properties. The procedure of fractionation which is preferred in accordance with the invention, however, has the aim of removing various undesirable accompanying substances, and of obtaining products of still better quality as regards color and appeal while largely preserving their natural composition.

The procedure of the invention can be conducted continuously or discontinuously by designing the apparatus accordingly. The extracts, too, can be withdrawn continuously or discontinuously during the extraction, or after the extraction has ended. Furthermore, it is possible to withdraw the extract alternately, in a manner known in itself, by alternating separators connected in parallel.

Another advantage of the claimed procedure is to be seen in the fact that, after the separating process, the extractant can be reused without additional laborious and power-consuming purification, by returning it to the extraction stage as in a recycling process. For this purpose it is necessary only to bring the gas to the pressure and temperature conditions prevailing in the extraction stage.

The extraction residue remaining from the starting material can, in the case of discontinuous operation, be removed from the extraction stage and replaced after completion of the extraction process. Here, again, there is the possibility of replacing the starting material without interrupting the course of the process, by the alternate operation, during the process, of extraction vessels installed in parallel. Furthermore, it is possible to connect the extraction vessels in tandem, in a manner known in itself, so that the possibility exists of performing the extraction countercurrently, thereby assuring a uniformly good utilization of the extractant. In the extraction stage, the starting material is treated with the gas, which is under supercritical conditions as regards pressure and temperature. Basically, extraction at subcritical temperatures with liquefied gases is possible, but, particularly in the high pressure range, the solvent power of the gas is substantially greater in the supercritical state, and the process is thus considerably more attractive economically. Indeed, it must be considered to be surprising that, in spite of these extraction conditions, it is possible to obtain wax products of complex structure in a high purity without impairment of the desired properties, so that they can be used directly for pharmaceutical, cosmetic and food processing purposes.

Preferably, a pressure is established in the extraction stage of the process of the invention, of from the critical pressure to 1000 bar, especially from 300 bar to 800 bar, and a temperature of from the critical temperature to 150° C., especially a temperature of 50° C. to 80° C. In the separation stage, it is preferable to operate at a pressure of 40 to 150 bar, preferably from 50 to 80 bar, and at a temperature between critical temperature and 100° C., preferably between 40° and 80° C. The critical pressure and temperature values Tk and Pk of the gases that are used can be found in the literature, and the process parameters can be established accordingly.

In the case of the carbon dioxide that is preferred as the extractant, the operating temperature in the extraction stage is in the range between 31.4° and 150° C., preferably at 40° to 100° C., and still more preferably at 50° to 80° C. The corresponding pressure range extends from 72 to 1000 bar, preferably from 200 to 900 bar, and still more preferably from 300 to 800 bar.

After the extraction stage the supercritical gas containing the extract is transferred to the separating part of the apparatus for the separation of the extract. The separation of extract and extractant is performed by a change of pressure and/or temperature, preferably by a change of pressure. For the pressure change of the preferentially used carbon dioxide, it is advantageous to lower the pressure to values below 150 bar, preferably to 40 to 100 bar, and especially to 50 to 80 bar.

For the temperature change, a raising or lowering thereof may be of advantage, depending on the circumstances. In no case, however, are temperatures below the critical temperature necessary. The preferred temperature range for carbon dioxide, thereof, is between 31.4° and 100° C., especially between 40° and 80° C., since in this manner the recovery of low-moisture extract can be simultaneously achieved, if the input substrate should have an appreciable moisture content.

By means of the procedure of the invention, a virtually quantitative recovery of product can be accomplished in an extractive treatment of the batch of raw material for only 1 to 10 hours.

The process of the invention therefore makes possible, especially if the process is conducted in an optimum manner, the profitable production of wax products of great value in a single process step, with a comparatively minimal investment of time and energy, without any pollution of the environment. The wax extracts can be made available directly for use in pharmaceuticals, cosmetics and foodstuffs. The claimed procedure is especially suitable for the recovery of carnauba wax, beeswax, wool wax, montan wax, jojoba wax, candelilla wax, ouricury wax, sugarcane wax, esparto grass wax, flax wax, cotton wax, japan wax and shellac wax.

The invention will be further explained below with reference to the appended drawing.

In the drawing, the sole FIGURE shows the diagram of an extraction apparatus by means of which the claimed process will be explained.

The extraction vessel E represented in the FIGURE is charged with the ground starting material, and then, if so desired, before the extraction begins the apparatus is purged free of air with carbon dioxide with valve V9 closed and valve V8 open. The extractant is taken from the gas supply tank G through the inlet valve V1, and introduced into the system through the regulating valve RV1, which is designed as a pressure reducing valve and determines both the intake pressure of the compressor K and the separating pressure in separator A2. Depending on the temperature setting of the heat exchanger W1, the extractant is delivered in liquefied or gas form to the compressor K, which can be designed, for example, as a compressor or liquid gas pump, and which compresses and pumps the extractant. The valve RV2 is preferably in the form of an overflow valve and has the purpose of keeping the predetermined extraction pressure constant by means of an apparatus for measurement (e.g., a DMS pressure receiver) and control (e.g., a pneumatically or hydraulically operated needle valve) by simply allowing the gas that is delivered by the compressor in excess of the desired pressure to flow back again. With this there is associated the operation of a safety means which, in the event of a disturbance in the extraction circuit, limits the pressure in the apparatus to the preset level. The extraction vessel E is, like two separators A1 and A2, a thermostat-controlled pressure tank which can be brought to the desired temperature by means of a thermostat-controlled water or steam jacket. Before the gas enters the extraction autoclave E or into the separation vessels A1 and A2, it is adjusted to the predetermined temperature by means of the heat exchangers W2, W3 and W4. Since the heat exchanger W2 in many cases has to remove compression heat, while the heat exchangers W3 and/or W4 usually have to put out heat to compensate the temperature drop due to expansion, the process is particularly attractive from the energy viewpoint if the heat exchangers W3 and W4 are connected by a heat pump, for example, to the heat exchanger W2.

After the extraction parameters of pressure and temperature have been set in the manner described, the supercritical extractant flows through the charged extraction vessel E, coming into intimate contact with the starting material and becoming charged with the substances contained therein. The gas containing the extract leaves the extraction vessel E through a filter system which prevents the mechanical entrainment of small particles, and is expanded at the metering valve RV3 to a pressure at which the extract separates wholly or partially from the gas phase. In the case of single-stage separation, the valve V4 remains closed and the gas passes through the heat exchanger W4 directly into the separator A2. In the case of separation in two or more stages, valve V5 remains closed and the mixture of charged supercritical gas and partially separated extract passes through the heat exchanger W3 first into separator A1 in which the separated part of the extract remains. The supercritical gas containing the rest of the extract in saturated solution is further expanded at the overflow valve RV4 which determines the pressure in the separation vessel A1, and it passes through the heat exchanger W4 into the separator A2. Here the remainder of the extract dissolved in the gas separates and remains in vessel A2. While the now uncharged, regenerated gas is being fed back again to the compressor K through the heat exchanger W1 and thus completes the cycle, the extract can be withdrawn through valves V6 and V7 while the extraction is still in progress, or else it can be withdrawn after the end of the process by opening the separator.

The following examples, which are performed using a pilot plant of the design represented in the drawing, will serve for the further explanation of the invention.

EXAMPLE 1

50 g of carnauba wax raw product of a greasy gray to black appearance is pulverised for 30 seconds in a cutting mill. The material is transferred to the extraction vessel and extracted for 8 hours with carbon dioxide under supercritical conditions at a pressure of 600 bar and a temperature of 60° C. The separation of the extract is performed in a single stage at a pressure of 60 bar and a temperature of 60° C.

44 g of a voluminous, pure white powder of a flaky, snowlike consistency is obtained. If sufficient space is made available for the extracted substance in the separation stage, the powder has a bulk density of 32 g/l. In comparison to the ground raw product, which has a bulk density of about 600 g/l, this means an increase in volume by a factor of 19. The cabbage-like odor of the starting substance is virtually absent in the extract.

EXAMPLE 2

100 g of raw, brownish beeswax from the Congo is pulverized under refrigeration in a cutting mill and treated in the above-described extraction apparatus for 6 hours with carbon dioxide at a pressure of 400 bar and a temperature of 50° C. The separation of the extract is accomplished by expanding to a pressure of 60 bar and a temperature of 40° C.

After one hour, 90 g of an extract of a pale, ivory-colored appearance, a mild, honey-like odor and a crumbly wax-like consistency can be removed from the separator. After another 5 hours, 77 g of a residual extract having a pure white color is obtained, which is virtually odorless and has a more dry-powdery consistency. While the dropping point of the extract first removed is slightly lower than the input substrate, the dropping point of the main fraction, at 65° to 66° C., is about 2° C. higher than that of the raw product.

EXAMPLE 3

60 g of raw wool wax in the form of a brown mass with a billy-goat odor is applied to an inert support material of large surface area, and this is placed in the extraction autoclave. Then the extraction is performed for 6 hours with supercritical carbon dioxide at a pressure of 400 bar and a temperature of 40° C. For the separation, the pressure is lowered to 50 bar at a temperature of 40° C.

When the separator is opened, at first a white, whipped-cream-like mass results, which when allowed to stand in the air or when degassed recovers the normal viscous-waxy consistency. After an extraction time of 2 hours, 24 g is obtained of a yellowish product with a slight odor, whereas after another 4 hours, 32 g is obtained of a virtually odorless, almost colorless product. When the separation temperature is increased markedly above the dropping point—to 70° C. for example—the wool wax can be withdrawn through the bottom valve of the separator.

EXAMPLE 4

First, 80 g of a dark brown-appearing, raw montan wax is pulverized and then extracted for seven hours with carbon dioxide at a pressure of 700 bar and a temperature of 60° C. The separation is performed at a pressure of 70 bar and a temperature of 50° C.

77 g of an initially orange-yellow, then beige-colored, brittle, crumbly substance is obtained, which is virtually odorless, while the powdered raw product has an unpleasant, turpentine-like, oily smell.

EXAMPLE 5

500 g of ground jojoba seeds are extracted for five hours with supercritical carbon dioxide at a pressure of 400 bar and a temperature of 40° C. The separation of the extract is performed in two stages. In separator A1 the gas phase is expanded to 100 bar, and in separator A2 it is expanded to 60 bar, at 40° C. in each case.

In separators A1, 205 g is obtained of a pale yellow, odorless and clear wax which is fluid at room temperature and has an acid number of 0.2. From separator A2, 20 g of a liquid, almost colorless wax with an acid number of 2.2 is withdrawn.

The ground starting material, which prior to extraction consists of partially cohering, wax-impregnated particles of dark appearance, yields after extraction a light gray, light-weight, dry and free-flowing powder in the separator vessel.

EXAMPLE 6

First, 1000 g of comminuted jojoba seeds are cold-pressed. 295 g is thus obtained of a pale yellow, slightly turbid, liquid wax. The press cake is pulverized and extracted for 7 hours with supercritical carbon dioxide at a pressure of 350 bar and a temperature of 40° C. For the separation of the extract, a pressure of 50 bar is applied at 40° C.

200 g is obtained of a pale yellow, liquid wax, made slightly turbid by a slight moisture content, which can be quickly clarified by centrifugation. The material has the following analysis: Gardner color: 5.5, d (20/20)=0.8720, n (20/20)=1.4657, acid number=0.3, saponification number=90, iodine number=80.

We claim:

1. Process for extractive production of natural wax from starting materials obtained from fossil, vegetable or animal sources, comprising
    extracting the starting materials with a physiologically unobjectional gas at supercritical pressure and temperature conditions; and, thereafter, separating the extract from the gas by changing the pressure and/or temperature conditions.

2. The process of claim 1 wherein the separating step takes place in a separating stage and further comprises removing the gas from the separating stage, for reuse in an extracting step.

3. The process of claim 1 further comprising comminuting the starting material before extracting.

4. The process of claim 1 wherein the extraction and/or separation is accomplished in a plurality of stages whereby the wax is recovered as a fractionated product.

5. The process of claim 4 wherein the plurality of stages is accomplished by a stepwise change in the pressure and/or temperature of the extracting gas.

6. The process of claim 5 wherein at least two pressure charges are used.

7. The process of claim 1 wherein the gas is an alkane or alkene of up to three carbon atoms; a partially or fully fluorinated alkane or alkene of up to three carbon atoms; $N_2O$; $CO_2$; $SF_6$; Ar; $N_2$; or a mixture thereof.

8. The process of claim 1 wherein the extraction is performed at a pressure of 72 bar to 1000 bar.

9. The process of claim 1 wherein the extraction is performed at a pressure of 300 bar to 800 bar.

10. The process of claim 1 wherein the extraction is performed at a temperature of 31.4° C. to 150° C.

11. The process of claim 1 wherein the extraction is performed at a temperature of 50° C. to 80° C.

12. The process of claim 1 wherein the separation is performed at 40 bar to 150 bar.

13. The process of claim 1 wherein the separation is performed at 50 bar to 80 bar.

14. The process of claim 1 wherein the separation is performed at 31.4° C. to 100° C.

15. The process of claim 1 wherein the separation is performed at 40° C. to 80° C.

16. The process of claim 1 wherein the gas is an alkane or alkene of up to three carbon atoms; a partially or fully fluorinated alkane or alkene of up to three carbon atoms; $N_2O$; $CO_2$; $SF_6$; Ar; $N_2$; or a mixture thereof; the extraction is performed at 72 bar to 1000 bar at 31.4° C. to 150° C.; and the separation is performed at 40 bar to 150 bar and at 31.4° C. to 100° C.

* * * * *